United States Patent
Comito et al.

(10) Patent No.: US 12,096,093 B2
(45) Date of Patent: Sep. 17, 2024

(54) USER RESPONSIVE DYNAMIC CONTENT TRANSFORMATION

(71) Applicant: Disney Enterprises, Inc., Burbank, CA (US)

(72) Inventors: Keith Comito, Seaford, NY (US); Daniel Cahall, Philadelphia, PA (US)

(73) Assignee: Disney Enterprises, Inc., Burbank, CA (US)

( * ) Notice: Subject to any disclaimer, the term of this patent is extended or adjusted under 35 U.S.C. 154(b) by 70 days.

(21) Appl. No.: 18/107,718

(22) Filed: Feb. 9, 2023

(65) Prior Publication Data
US 2024/0276078 A1 Aug. 15, 2024

(51) Int. Cl.
*H04N 21/854* (2011.01)
*H04N 21/233* (2011.01)
*H04N 21/234* (2011.01)
*H04N 21/442* (2011.01)
*H04N 21/81* (2011.01)

(52) U.S. Cl.
CPC ......... *H04N 21/854* (2013.01); *H04N 21/233* (2013.01); *H04N 21/234* (2013.01); *H04N 21/44213* (2013.01); *H04N 21/8106* (2013.01)

(58) Field of Classification Search
CPC .. H04N 21/854; H04N 21/233; H04N 21/234; H04N 21/44213; H04N 21/8106
See application file for complete search history.

(56) References Cited

U.S. PATENT DOCUMENTS

| | | | | |
|---|---|---|---|---|
| 2021/0074267 | A1* | 3/2021 | Higurashi | G10H 1/0008 |
| 2021/0248983 | A1* | 8/2021 | Balassanian | G06N 3/08 |
| 2024/0054233 | A1* | 2/2024 | Ohayon | G06F 21/577 |

OTHER PUBLICATIONS

Jesse Engel, Hanoi Hantrakul, Chenjie Gu, Adam Roberts "DDSP: Differential Digital Signal Processing" Jan. 15, 2020 5 Pgs. https://magenta.tensorflow.org/ddsp.
"HTTP Live Streaming" 2009 14 Pgs. https://en.wikipedia.org/wiki/HTTP_Live_Streaming.
"Nier: Automata" 2017 29 Pgs. https://en.wikipedia.org/wiki/Nier:_Automata.
"Spleeter by Deezer" Sep. 3, 2021 5 Pgs. https://github.com/deezer/spleeter.
"Theremin" 2023 15 Pgs. https://en.wikipedia.org/wiki/Theremin.

* cited by examiner

*Primary Examiner* — Nnenna N Ekpo
(74) *Attorney, Agent, or Firm* — Farjami & Farjami LLP

(57) ABSTRACT

A system includes a hardware processor and a memory storing software code and one or more machine learning (ML) model(s) trained to transform content. The hardware processor executes the software code to ingest content components each corresponding respectively to a different feature of multiple features included in a content file, receive sensor data describing at least one of an action or an environment of a system user, and identify, using the sensor data, at least one of the content components as content to be transformed. The hardware processor further executes the software code to transform, using the ML model(s), that identified content to provide at least one transformed content component, combine a subset of the ingested content components with the at least one transformed content component to produce a dynamically transformed content, and output the dynamically transformed content in real-time with respect to ingesting the content components.

24 Claims, 6 Drawing Sheets

USER RESPONSIVE DYNAMIC CONTENT TRANSFORMATION

BACKGROUND

Digital media content in the form of streaming movies and television (TV) content, for example, is consistently sought out and enjoyed by users. However, in the conventional art, the media content transmitted to users, such as movies, streaming series, and TV program content, is typically pre-rendered and fixed in terms of the number of different visual effects and audio tracks delivered, as well as the characteristics of those pre-rendered features. For example, with respect to audio features of such pre-rendered content, the sound effects, dialogue, background music, specific voices, the use of specific musical instruments, and so forth, of that pre-rendered content are typically completely predetermined.

Nevertheless, in an increasingly diverse consumer environment, the tastes and preferences of individual users may vary widely. Consequently, even media content embodying artistic excellence and high production values may be less pleasing to some users than its inherent qualities merit. Due to the resources often devoted to developing new content, the ability to tailor such content to the differing tastes of as many users as possible has become increasingly important to the producers, owners, and distributors of digital media content. Moreover, enabling the tailoring of some features of content in response to individual user tastes and behavior has the potential to make the consumption of such content more desirable and engaging to all users. Consequently, there is a need in the art for a content delivery solution enabling the dynamic transformation of some content features in real-time in response to user preferences.

DETAILED DESCRIPTION

Figure 1:
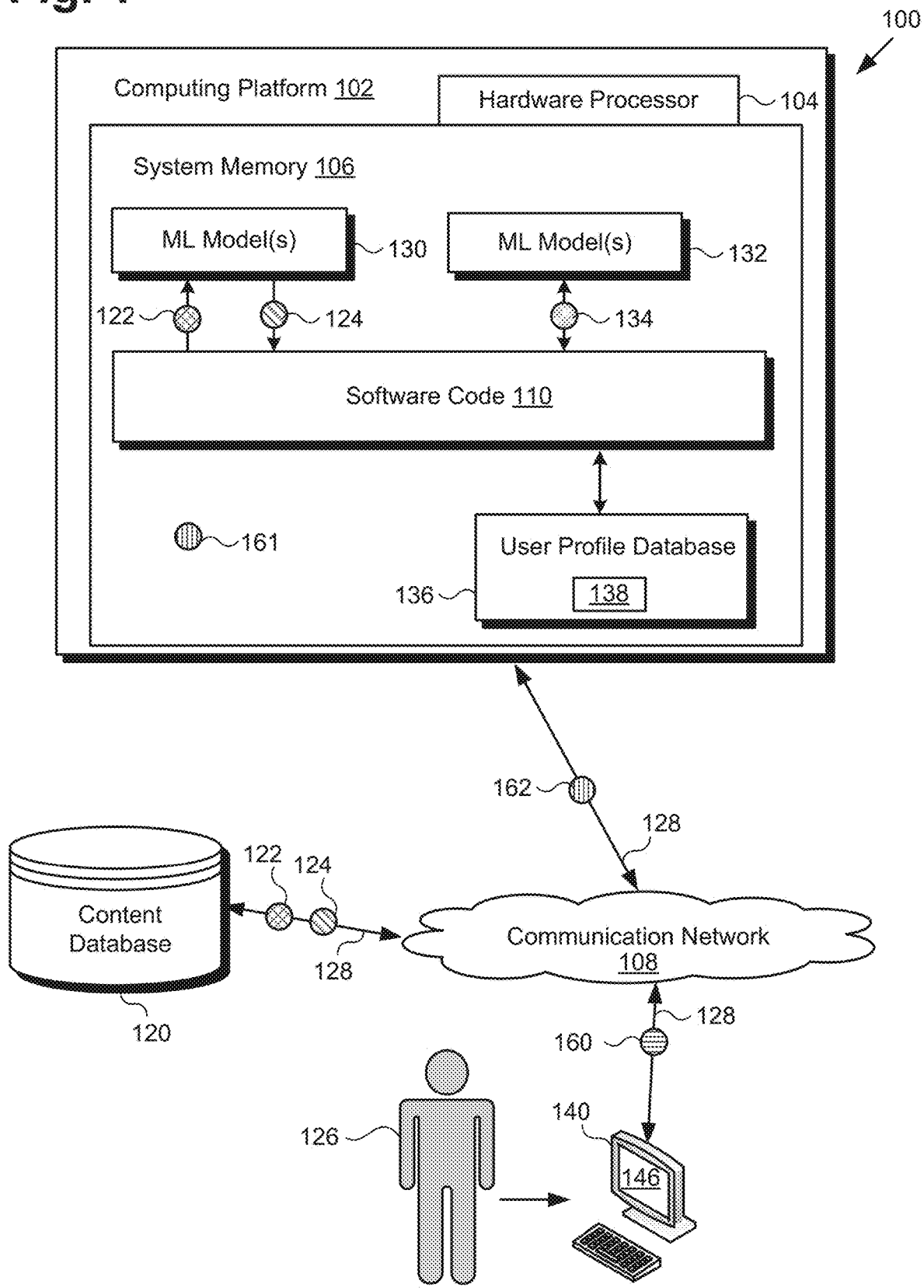
FIG. 1 shows an exemplary system for performing user responsive dynamic content transformation, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing user responsive dynamic content transformation. As described above, in the conventional art, media content transmitted to users, such as movies, streaming series, and television (TV) program content, is typically pre-rendered and fixed in terms of the number of different visual effects and audio tracks delivered, as well as the characteristics of those pre-rendered features. For example, with respect to audio features of such pre-rendered content, the sound effects, dialogue, background music, specific voices, the use of specific musical instruments, and so forth, of that pre-rendered content are typically completely predetermined. Nevertheless, in an increasingly diverse consumer environment, the tastes and preferences of individual users may vary widely. Consequently, even media content embodying artistic excellence and high production values may undesirably be less pleasing to some users than its inherent qualities merit. Moreover, enabling the tailoring of some features of content in response to individual user tastes and behavior has the potential to make the consumption of such content more desirable and engaging to all users.

The user responsive dynamic content transformation solution disclosed in the present application advances the state-of-the-art by utilizing one or more trained machine learning (ML) models to selectively transform one or more pre-rendered content components included in a content file, such as individual audio tracks or video sequences for example, in response to a variety of different factors. Examples of those factors may include one or more of user behavior, user gestures, user spoken commands, environmental factors such as local weather, content metadata, and interaction with connected Internet of things (IoT) devices, to name a few.

Moreover, the present user responsive dynamic content transformation solution advantageously results in transformation of one or more content components in real-time with respect to ingesting the content components or receiving the content file that contains those content components, which may be a mixed or multiplexed content file, for example. It is noted that, as defined for the purposes of the present application, the expressions "mixed" and "mixing" refers to traditional audio and video mixing. Consequently, in the case of mixed audio, the expression "mixed content file" may refer to a content file having a single audio track with all audio data combined. By contrast, in the case of audio a "multiplexed content file" refers to a content file that includes a single audio file containing multiple distinct audio tracks that are interleaved, as is done with certain Dolby® formats. It is further noted that, as defined for the purposes of the present application, the expression "real-time," with respect to the dynamic transformation of content, refers to dynamically transformed content components that are presented to a user with no user perceptible latency relative to the contemporaneous presentation of pre-rendered content components.

It is also noted that the present user responsive dynamic content transformation solution can advantageously be implemented as automated systems and methods. As defined in the present application, the terms "automation," "automated," and "automating" refer to systems and processes that do not require the participation of a human system operator. Thus, the methods described in the present application may be performed under the control of hardware processing components of the disclosed automated systems. However, in some implementations it may be advantageous or desirable for a system administrator, content provider, or even a user to affirmatively participate in governing content transformations. For example, in some use cases a human content provider might modify a configuration file that lessens or increases the impact of one of the input factors (like weather conditions), and affects how the system works for all users. Moreover, in some use cases the content transformations performed by one user involved in a group watch experience with other users can affect the possible content transformations for other users participating in the group watch. As yet another exemplary use case, a celebrity may be performing a real-time karaoke or improvisational stream and content transformations selected by the celebrity may affect what content transformations are possible for viewers of the celebrity's streaming performance.

The dynamic transformation of a pre-rendered audio component may include transforming character speech or song into sounds produced by a musical instrument, while leaving other pre-rendered audio components unaffected, or isolating and modifying the volume of the voice of a specific character in a particular shot or scene. Dynamic transformation of a pre-rendered video component may include modifying pixel intensity or color when rendering a visual feature, while leaving other pre-rendered visual features unaffected, or isolating and modifying visual features within a particular shot or scene. It is further noted that, as used in the present application, the term "scene," as applied to video content, is a shot or series of shots that together deliver a single, complete and unified dramatic element of film narration, or block of storytelling within a film. Moreover, as used in the present application, the term "shot" refers to a sequence of frames of video that are captured from a unique camera perspective without cuts or other cinematic transitions.

The present user responsive dynamic content transformation solution employs one or more ML models specifically trained to transform content, and may further employ one or more ML models trained to separate pre-rendered content components each corresponding respectively to a different feature of multiple features included in a content file prior to transformation of one or more of those pre-rendered components. The complexity involved in reliably transforming content in real-time makes human performance of the present solution in feasible timeframes impossible, even with the assistance of the processing and memory resources of a general purpose computer.

As defined in the present application, the expression "machine learning model" or "ML model" may refer to a mathematical model for making future predictions based on patterns learned from samples of data or "training data." For example, machine learning models may be trained to perform image processing, natural language understanding (NLU), and other inferential data processing tasks. Various learning algorithms can be used to map correlations between input data and output data. Such an ML model may include one or more logistic regression models. Bayesian models, or artificial neural networks (NNs). A "deep neural network," in the context of deep learning, may refer to an NN that utilizes multiple hidden layers between input and output layers, which may allow for learning based on features not explicitly defined in raw data.

Examples of the types of content to which the present user responsive dynamic content transformation solution may be applied include audio-video content having both audio and video components, audio unaccompanied by video, and video unaccompanied by audio. In addition, or alternatively, in some implementations, the type of content that is dynamically transformed according to the present novel and inventive principles may be or include digital representations of persons, fictional characters, locations, objects, and identifiers such as brands and logos, for example, which populate a virtual reality (VR), augmented reality (AR), or mixed reality (MR) environment. Moreover, that content may depict virtual worlds that can be experienced by any number of users synchronously and persistently, while providing continuity of data such as personal identity, user history, entitlements, possessions, payments, and the like. It is noted that the user responsive dynamic content transformation solution disclosed by the present application may also be applied to content that is a hybrid of traditional audio-video and fully immersive VR/AR/MR experiences, such as interactive video.

FIG. 1 shows exemplary system 100 for performing user responsive dynamic content transformation, according to one implementation. As shown in FIG. 1, system 100 includes computing platform 102 having hardware processor 104 and system memory 106 implemented as a computer-readable non-transitory storage medium. According to the present exemplary implementation, system memory 106 stores software code 110, optional one or more ML models 130 trained to separate pre-rendered content elements contained by a mixed content file (hereinafter "ML model(s) 130"), one or more ML models 132 trained to transform content (hereinafter "ML model(s) 132"), and user profile database 136 including user profile 138.

As further shown in FIG. 1, system 100 is implemented within a use environment including communication network 108, content database 120, client device 140 including display 146, and user 126 of system 100 and client device 140. In addition, FIG. 1 shows content file 122, which may be a mixed or multiplexed content file for example, pre-rendered content components 124 that have been separated from content file 122, sensor data 160 generated by client device 140, sensor data 161 obtained by system 100 independently of client device 140, one or more transformed content components 134 (hereinafter "transformed content component(s) 134") produced by ML model(s) 132, and dynamically transformed content 162 output by system 100 and including transformed content component(s) 134 as well as a subset of pre-rendered content components 124. Also shown in FIG. 1 are network communication links 128 of communication network 108 interactively connecting system 100, content database 120, and client device 140.

With respect to content file 122 and pre-rendered content components 124, it is noted that content file 122 includes pre-rendered content components 124 prior to their separation. e.g., un-mixing or de-multiplexing. Content file 122 and pre-rendered content components 124 are shown as separate features in FIG. 1 because, in some implementations, pre-rendered content components 124 may have previously been separated and extracted from content file 122, in which cases pre-rendered content components 124 may be provided to system 100 or client device 140 as such. However, in other implementations, content file 122 including a combination of pre-rendered content components 124 may be received from content database 120, and pre-rendered content components 124 may be separated from content file 122 using optional ML model(s) 130, or may be otherwise separated from one another.

It is further noted that although content database 120 is depicted as a database remote from system 100 and accessible via communication network 108 and network communication links 128, that representation is merely by way of example. In other implementations, content database 120 may be included as a feature of system 100 and may be stored in system memory 106. It is also noted that although user profile database 136 is depicted as including a single user profile 138 of user 126, that representation too is provided merely by way of example. More generally, user profile database 136 may include a user profile for each user of system 100, such as each of hundreds, thousands, tens of thousands, hundreds of thousands, or millions of users of system 100, for example.

Although the present application refers to software code 110, ML model(s) 132, user profile database 136, and optional ML model(s) 130 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs such as DVDs, RAM, programmable read-only memory (PROM), erasable PROM (EPROM), and FLASH memory.

Moreover, although FIG. 1 depicts software code 110, ML model(s) 132, user profile database 136, and optional ML model(s) 130 as being co-located in system memory 106, that representation is also provided merely as an aid to conceptual clarity. More generally, system 100 may include one or more computing platforms 102, such as computer servers for example, which may be co-located, or may form an interactively linked but distributed system, such as a cloud-based system or blockchain, for instance. As a result, hardware processor 104 and system memory 106 may correspond to distributed processor and memory resources within system 100. Consequently, in some implementations, one or more of software code 110, ML model(s) 132, user profile database 136, and optional ML model(s) 130 may be stored remotely from one another on the distributed memory resources of system 100. It is also noted that, in some implementations, one or both of ML model(s) 132 and optional ML model(s) 130 may take the form of software modules included in software code 110.

Hardware processor 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for AI processes such as machine learning.

In some implementations, computing platform 102 may correspond to one or more web servers accessible over a packet-switched network such as the Internet, for example. Alternatively, computing platform 102 may correspond to one or more computer servers supporting a wide area network (WAN), a local area network (LAN), or included in another type of private or limited distribution network. In addition, or alternatively, in some implementations, system 100 may utilize a local area broadcast method, such as User Datagram Protocol (UDP) or Bluetooth, for instance. Furthermore, in some implementations, system 100 may be implemented virtually, such as in a data center. For example, in some implementations, system 100 may be implemented in software, or as virtual machines. Moreover, in some implementations, communication network 108 may be a high-speed network suitable for high performance computing (HPC), for example a 10 GigE network or an Infiniband network.

It is further noted that, although client device 140 is shown as a desktop computer in FIG. 1, that representation is provided merely by way of example. In other implementations, client device 140 may take the form of any suitable mobile or stationary computing device or system that implement data processing capabilities sufficient to provide a user interface, support connections to communication network 108, and implement the functionality ascribed to client device 140 herein. That is to say, in other implementations, client device 140 may take the form of a laptop computer, tablet computer, or smartphone, or a wearable device such as a smartwatch or AR or VR device, to name a few examples.

It is also noted that display 146 of client device 140 may take the form of a liquid crystal display (LCD), a light-emitting diode (LED) display, an organic light-emitting diode (OLED) display, a quantum dot (QD) display, or any other suitable display screen that perform a physical transformation of signals to light. Furthermore, display 146 may be physically integrated with client device 140 or may be communicatively coupled to but physically separate from client device 140. For example, where client device 140 is implemented as a smartphone, laptop computer, or tablet computer, display 146 will typically be integrated with client device 140. By contrast, where client device 140 is implemented as a desktop computer, display 146 may take the form of a monitor separate from client device 140 in the form of a computer tower.

By way of overview, according to some implementations, user 126, who may be a content consumer such as a subscriber or guest user of a streaming content platform for example, may utilize client device 140 to obtain dynamically transformed content 162 from system 100. In order to provide dynamically transformed content 162 to client device 140, hardware processor 104 of computing platform 102 may execute software code 110 to ingest pre-rendered content components 124, each of which corresponds respectively to a different feature of content file 122, such as different character imagery, different character dialogue or other audio tracks, and the like. Hardware processor 104 may further execute software code 110 to receive sensor data 160 from client device 140, where sensor data 160 describes one or more of an action by user 126 of system 100 or an environment of user 126, and identify, using sensor data 160, transformed content component(s) 134 corresponding to one or more of pre-rendered content components 124. Hardware processor 104 may then execute software code 110 to transform, using ML model(s) 132 trained to transform content, that or those pre-rendered content components to transformed content component(s) 134, combine at least some of pre-rendered content components 124 with the transformed content component(s) 134 to produce dynamically transformed content 162. Dynamically transformed content 162 may then be output by system 100 in real-time with respect to ingesting pre-rendered content components 124.

It is noted that, in some implementations, in order to ingest pre-rendered content components 124, hardware processor 104 may execute software code 110 to initially receive content file 122 and separate pre-rendered content components 124 from content file 122. In those implementations, dynamically transformed content 162 may be output by system 100 in real-time with respect to receiving content file 122.

As a specific but non-limiting example of the foregoing functionality in which user 126 selectively causes some audio features of content file 122 to be dynamically modified, the user may control the voice track of a first character depicted in content file 122 using their right hand, for example, and may control the voice track of a second character depicted in content file 122 using their left hand. For instance, user 126 positions their right hand in a certain area and performs a gesture which leads to the separation of the voice track of the first character. The user may then make another gesture with their right hand to transform the voice of the character into a trumpet or other musical instrument, and then may raise or lower their right hand to make the trumpet louder or quieter, respectively, in dynamically transformed content 162. User 126 might execute a different sequence of positions and gestures with their left hand to transform the voice track of the second character to an alternative voice, which too could be made louder or quieter.

In some implementations, as depicted in FIG. 1, the processes of content transformation, or separation of pre-rendered content components followed by content transformation, can be performed by system 100. However, and as further described below by reference to FIGS. 3 and 5B, in other implementations those processes may be performed by client device 140, or may be distributed between system 100 and client device 140 such that system 100 performs some of those processes and client device 140 performs others.

It is noted that, in some implementations, the combining of at least some of pre-rendered content components 124 with the transformed content component(s) 134 result in dynamically transformed content 162 being mixed or multiplexed content. In some implementations, combining by mixing may produce a single newly rendered audio track, a single newly rendered video track, or both. However, in some other implementations, combining by multiplexing may result in dynamically transformed content 162 that includes an audio file including multiple interleaved audio tracks, a video file including interleaved or vertically layered video, or an audio file including multiple interleaved audio tracks and a video file including interleaved or vertically layered video. In yet other implementations, combining may result in dynamically transformed content 162 including a collection of multiple separate media content tracks, such as one or more audio tracks, one or more video sequences, or one or more audio tracks and one or more video sequences, for example.

Figure 2:
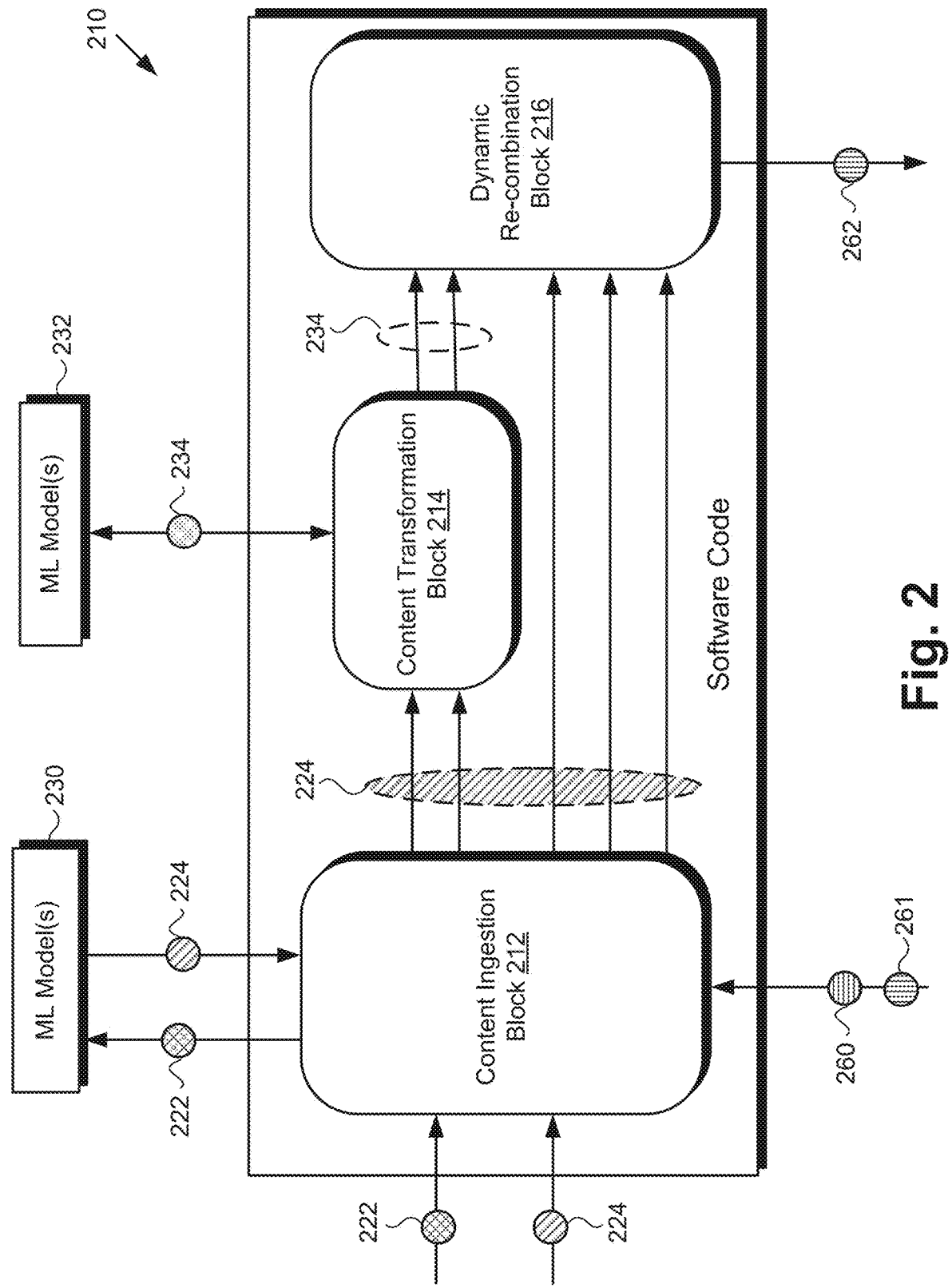
FIG. 2 shows a diagram of an exemplary software code suitable for use by a system for performing user responsive dynamic content transformation, according to one implementation.

FIG. 2 shows a diagram of exemplary software code 210 suitable for use by system 100 for performing user responsive dynamic content transformation, according to one implementation. According to the exemplary implementation shown in FIG. 2, software code 210 includes content ingestion block 212, content transformation block 214, and dynamic combination block 216. As shown in FIG. 2, content ingestion block is configured to receive content file 222 or pre-rendered content components 224 previously separated from content file 222, as well as one or both of sensor data 260 and 261, to selectively output one or more of pre-rendered content components 224 to content transformation block 214, and to output others of pre-rendered content components 224 to dynamic combination block 216. It is noted that in implementations in which content ingestion block 212 receives content file 222 rather than pre-rendered content components 224, software code 210 may utilize one or more ML models 230 (hereinafter "ML model(s) 230") to separate pre-rendered content components 224 from content file 222 when content file 222 is a mixed content file, or may otherwise de-multiplex pre-rendered content components 224 from content file 222 when content file 222 is a multiplexed content file.

Regarding ML model(s) 230, it is noted that in some implementations. ML model(s) 230 may take the form of one or more NNs, such as U-Nets or Transformers, for example. Moreover, in some implementations, ML model(s) 230 may include a source separation model which focuses on voice separation.

Content transformation block 214 utilizes one or more ML models 232 trained to transform content (hereinafter "ML model(s) 232") to transform those of pre-rendered content components 224 received from content ingestion block 212 to one or more transformed content components 234 (hereinafter "transformed content component(s) 234"). ML model(s) 232 may be implemented using an autoencoder architecture for example, configured to synthesize and transform content. It is noted that the selection of which of pre-rendered content components 224 are to be output to content transformation block 214, as well as the identification of transformed content component(s) 234 to be generated by content transformation block 214 using ML model(s) 232 may be performed based on one or more of several criteria. Those criteria may include sensor data 260 describing one or more of an action by a system user, such as a movement or gesture by user 126 in FIG. 1, and the environment of the system user, such as the presence of a particular object or IoT enabled device possessed by the system user or within a predetermined distance from the system user. In addition, or alternatively, those criteria may include sensor data 261, metadata included in content file 222, or a user profile of the system user, such as user profile 138 in FIG. 1 for example, describing known preferences of the system user and including a user history of the system user.

As further shown in FIG. 2, content transformation block 214 outputs transformed content component(s) 234 to dynamic combination block 216, which combines those of pre-rendered content components 224 received from content ingestion block 212 with transformed content component(s) 234 to produce dynamically transformed content 262.

Software code 210, ML model(s) 232 trained to transform content, and optional ML model(s) 230 trained to separate pre-rendered content components 224 from a mixed content file correspond respectively in general to software code 110, ML model(s) 132, and optional ML model(s) 130, in FIG. 1. Thus, software code 110, ML model(s) 132, and optional ML model(s) 130 may share any of the characteristics attributed to respective software code 210, ML model(s) 232, and optional ML model(s) 230 by the present disclosure, and vice versa. That is to say, although not shown in FIG. 1, software code 110 may include features corresponding to content ingestion block 212, content transformation block 214, and dynamic combination block 216.

In addition, content file 222, pre-rendered content components 224, sensor data 260, sensor data 261, transformed content component(s) 234, and dynamically transformed content 262 correspond respectively in general to content file 122, pre-rendered content components 124, sensor data 160, sensor data 161, transformed content component(s) 134, and dynamically transformed content 162. Consequently, content file 122, pre-rendered content components 124, sensor data 160, sensor data 161, transformed content component(s) 134, and dynamically transformed content 162 may share any of the characteristics attributed to respective content file 222, pre-rendered content components 224, sensor data 260, transformed content component(s) 234, and dynamically transformed content 262 by the present disclosure, and vice versa.

Figure 3:
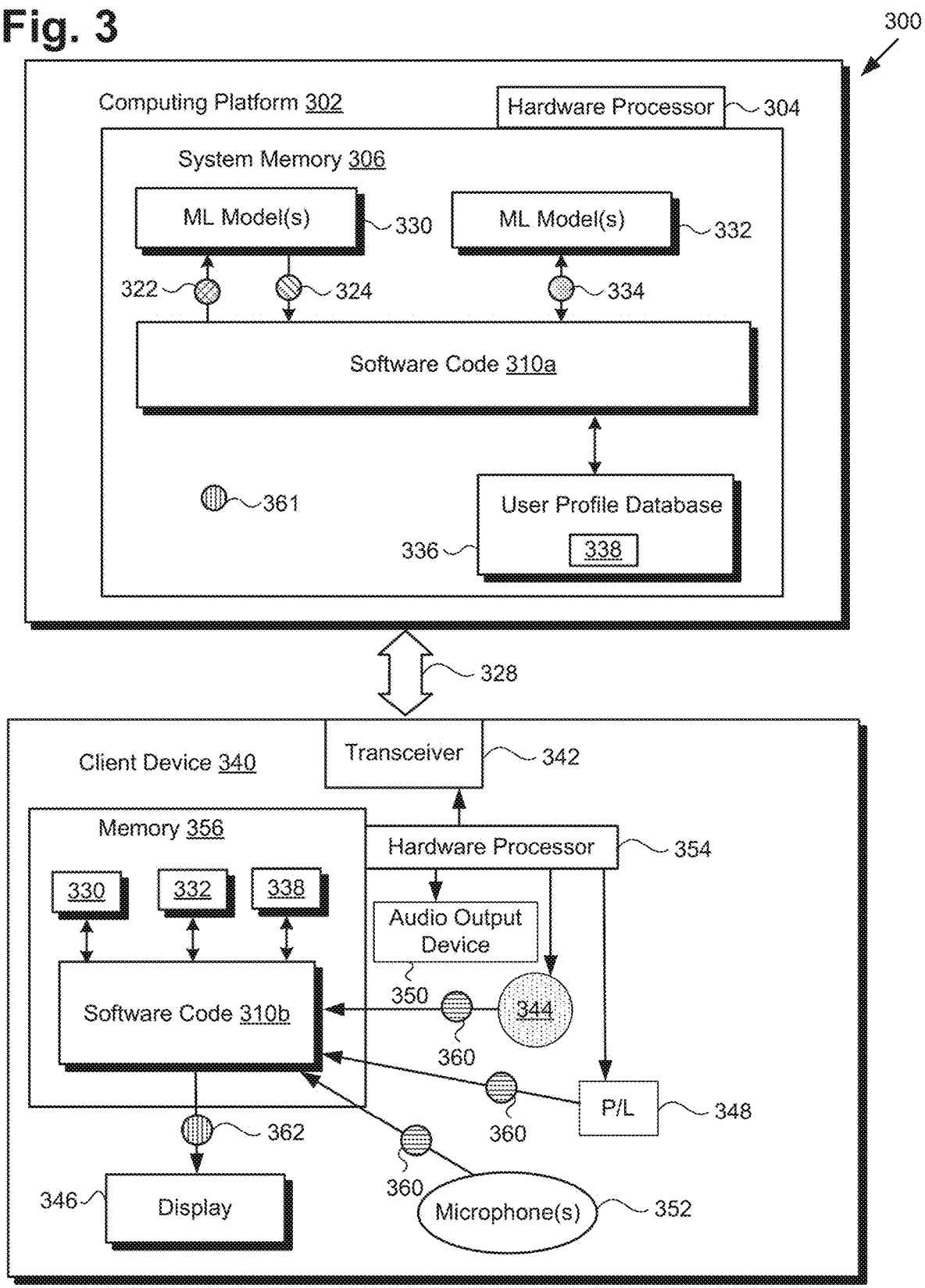
FIG. 3 shows a diagram including a more detailed representation of a client device configured to perform user responsive dynamic content transformation, according to one implementation.

FIG. 3 shows a diagram including a more detailed representation of client device 340 configured to perform user responsive dynamic content transformation, according to one implementation. According to the exemplary implementation shown in FIG. 3, client device 340 is interactively connected to system 300 over network communication link 328.

As shown in FIG. 3, client device 340 includes hardware processor 354 and memory 356 implemented as a computer-readable non-transitory storage medium storing software code 310b. As further shown in FIG. 3, in some implementations memory 356 may optionally store one or more ML models 332 trained to transform content (hereinafter "ML model(s) 332"), one or more ML models 330 trained to separate pre-rendered content components from a mixed content file (hereinafter "ML model(s) 330"), and user profile 338. In addition, client device 340 includes transceiver 342, display 346, speaker or other audio output device 350, and may further include one or more cameras 344 (hereinafter "camera(s) 344"), one or more position/location sensors 348 (hereinafter "P/L sensor(s) 348"), one or more microphones 352 (hereinafter "microphone(s) 352"), or any combination thereof. Also shown in FIG. 3 are sensor data 360 received as inputs by software code 310b, and dynamically transformed content 362 output by software code 310b.

As also shown in FIG. 3, system 300 includes computing platform 302 having hardware processor 304 and system memory 306 implemented as a computer-readable non-transitory storage medium. According to the exemplary implementation shown in FIG. 3, system memory 306 stores software code 310a, one or more ML models 332 trained to transform content (hereinafter "ML model(s) 332"), user profile database 336 including user profile 338, and optional one or more ML models 330 trained to separate pre-rendered content elements contained by a mixed content file (hereinafter "ML model(s) 330"). FIG. 3 further shows content file 322, pre-rendered content components 324, and one or more transformed content components 334 (hereinafter "transformed content component(s) 334").

Network communication link 328 and system 300 including computing platform having hardware processor 304 and system memory 306, and user profile database 336 including user profile 338 correspond respectively in general to network communication links 128 and system 100 including computing platform 102 having hardware processor 104 and system memory 106, and user profile database 136 including user profile 138, in FIG. 1. Thus, network communication links 128, system 100, and user profile database 138 may share any of the characteristics attributed to respective network communication link 328, system 300, and user profile database 338 by the present disclosure, and vice versa.

In addition, software code 310a, ML model(s) 330, ML model(s) 332, content file 322, pre-rendered content components 324, and transformed content component(s) 334 correspond respectively to software code 110/210, ML model(s) 130/230, ML model(s) 132/232, content file 122/222, pre-rendered content components 124/224, and transformed content component(s) 134/234, in FIGS. 1 and 2. Consequently, software code 310a, ML model(s) 330, ML model(s) 332, content file 322, pre-rendered content components 324, and transformed content component(s) 334 may share any of the characteristics attributed to respective software code 110/210, ML model(s) 130/230, ML model(s) 132/232, content file 122/222, pre-rendered content components 124/224, and transformed content component(s) 134/234 by the present disclosure, and vice versa.

Client device 340 having display 346 corresponds in general to client device 140 having display 146, in FIG. 1. Thus, client device 340 and display 346 may share any of the characteristics attributed to client device 140 and display 146 by the present disclosure. That is to say, like client device 140, client device 340 may take the form of a desktop computer, laptop computer, tablet computer, or smartphone, or a wearable device such as a smartwatch or AR or VR device, to name a few examples, while display 346 may be an LCD, an LED display, an OLED display, a QD display, or any other suitable display screen that perform a physical transformation of signals to light. Moreover, in addition to display 146, client device 140 may include features corresponding respectively to hardware processor 354, memory 356 storing software code 310b and optionally storing ML model(s) 330, ML model(s) 332, and user profile 338, transceiver 342, speaker or other audio output device 350, and may further include camera(s) 344, P/L sensor(s) 348, and microphone(s) 352.

Hardware processor 354 of client device 140/340 may include multiple hardware processing units, such as one or more CPUs, one or more GPUs, and one or more TPUs, as those features are described above, as well as one or more FPGA, and custom hardware for machine-learning training or inferencing, for example.

Transceiver 342 of client device 140/340 may be implemented as any suitable wireless communication unit. For example, transceiver 342 may be implemented as a fourth generation (4G) wireless transceiver, or as a 5G wireless transceiver. In addition, or alternatively, transceiver 342 may be configured for communications using one or more of Wireless Fidelity (Wi-Fi), Worldwide Interoperability for Microwave Access (WiMAX), Bluetooth, Bluetooth low energy. ZigBee, radio-frequency identification (RFID), near-field communication (NFC), and 60 GHz wireless communications methods.

Camera(s) 344 may include one or more still image cameras, one or more video cameras, or one or more still image cameras and one or more video cameras. Moreover, in some implementations, camera 364 may correspond to an array of still image cameras, video cameras, or both, configured to generate a panoramic image.

P/L sensor(s) 348 may include one or more accelerometers, and/or gyroscopes, and/or a Global Positioning System (GPS) receiver, and/or a magnetometer, for example. In some implementations, P/L sensor(s) 348 may be implemented as an inertial measurement unit (IMU), as known in the art. Microphone(s) 352 may include one or more electret condenser microphones or other microelectromechanical system (MEMs) microphones.

With respect to software code 310b, and referring to FIGS. 1, 2, and 3 in combination, it is noted that in some implementations, software code 310b may be a thin client application of software code 110/210/310a. In those implementations, software code 310b may enable client device to provide sensor data 160/260/360 to system 100/300 for processing, and to receive and render dynamically transformed content 162/262/362 using one or both of display 146/346 and audio output device 350. However, in other implementations, software code 310b may include substantially all of the features and functionality of software code 110/210/310a. In some of those latter implementations, client device 140/340 may be configured as a standalone system for performing user responsive dynamic content transformation based on content file 122/222 or pre-rendered content components 124/224 and sensor data 160/260/360 and using one or more of ML model(s) 230/330 and ML model(s) 232/332.

According to the exemplary implementation shown in FIG. 3, software code 310b is located in memory 356 of client device 140/340, subsequent to transfer of software code 310b to client device 140/340 over a packet-switched network, such as the Internet, for example, or subsequent to transfer from an external computer-readable non-transitory storage medium. Once present on client device 140/340, software code 310b may be persistently stored in memory 356 and may be executed locally on client device 140/340 by hardware processor 354.

The functionality of system 100/300 including software code 110/310a and client device 140/340 including software code 310b will be further described by reference to FIG. 4, which shows flowchart 470 presenting a method for performing user responsive dynamic content transformation, according to one exemplary implementation. With respect to the actions described in FIG. 4, it is noted that certain details and features have been left out of flowchart 470 in order not to obscure the discussion of the inventive features in the present application.

Figure 4:
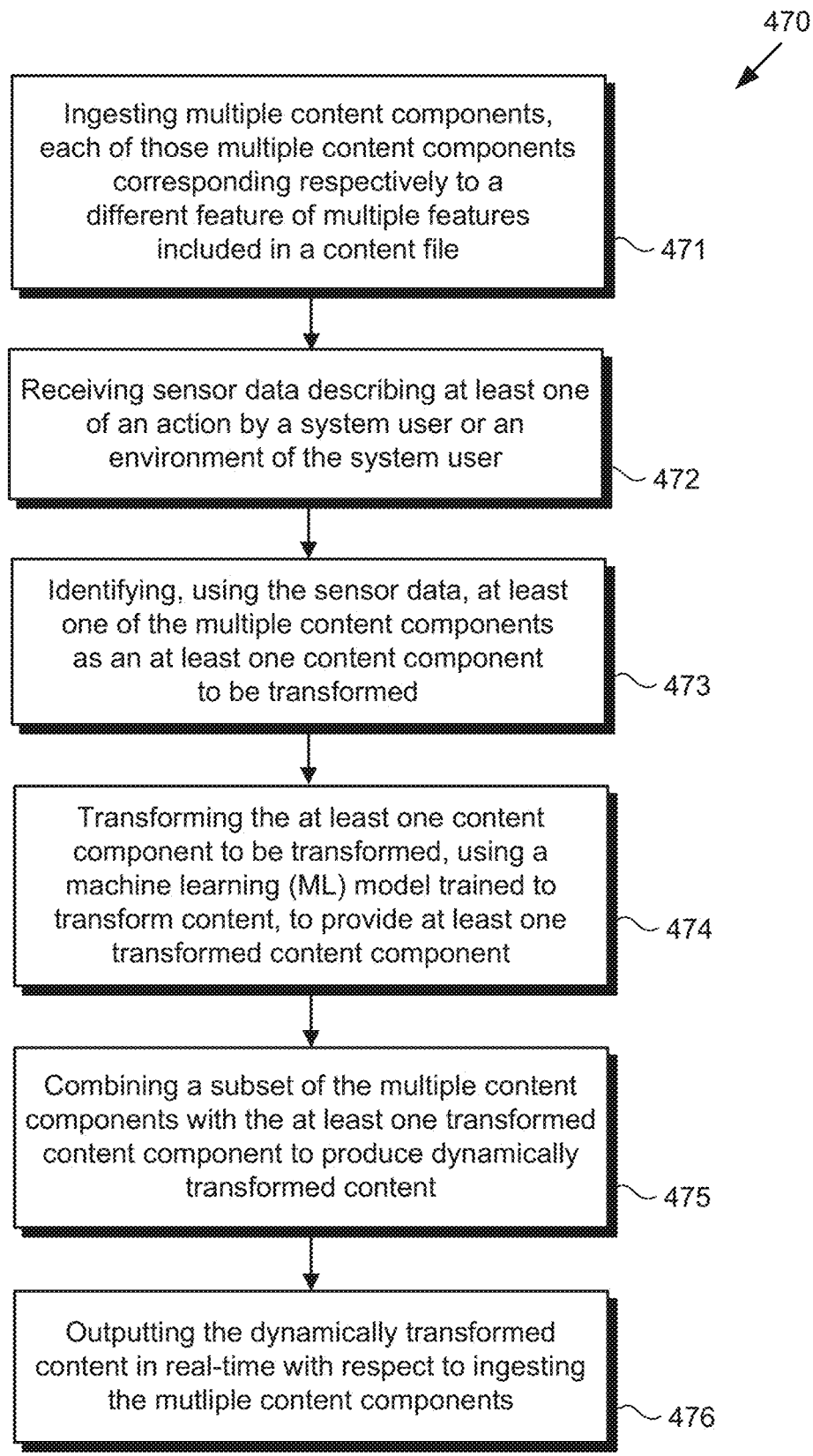
FIG. 4 shows a flowchart presenting an exemplary method for performing user responsive dynamic content transformation, according to one implementation.

Referring to FIG. 4 in combination with FIGS. 1, 2, and 3, flowchart 470 includes ingesting pre-rendered content components 124/224/324, each of pre-rendered content components 124/224/324 corresponding respectively to a different feature of multiple features included in content file 122/222/322 (action 471). As noted above, in some implementations, pre-rendered content components 124/224/324 may have previously been separated from content file 122/222/322 and may be ingested directly from content database 120. However, in other implementations, content file 122/222/322 including pre-rendered content components 124/224/324 may be received from content database 120, and pre-rendered content components 124/224/324 may be separated from content file 122/222/322 using optional ML model(s) 130/230/330 when content file 122/222/322 is a mixed content file, or may be otherwise de-multiplexed when content file 122/222/322 is a multiplexed content file.

In some implementations, pre-rendered content components 124/224/324 may be ingested in action 471 by software code 110/210/310a, executed by hardware processor 104/304 of system 100/300, and using content ingestion block 212 of software code 110/210/310a. However, in other implementations, pre-rendered content components 124/224/324 may be ingested in action 471 by software code 210/310b, executed by hardware processor 354 of system client device 140/340, and using content ingestion block 212 of software code 210/310b. Moreover, in some implementations, in order to ingest pre-rendered content components 124/224/324 in action 471, hardware processor 104/304 may execute software code 110/210/310a, or hardware processor 354 may execute software code 210/310b, to initially receive content file 122/222/322 and separate, using optional ML model(s) 130/230/330, pre-rendered content components 124/224/324 from content file 122/222/322 when content file 122/222/322 is a mixed content file, or may be otherwise de-multiplexed when content file 122/222/322 is a multiplexed content file.

As further noted above, the types of content to which the present user responsive dynamic content transformation solution may be applied include audio-video content having both audio and video components, audio unaccompanied by video, and video unaccompanied by audio. That is to say, in some implementations, pre-rendered content components 124/224/324 may include one or more audio tracks, one or more video sequences, or one or more audio tracks and one or more video sequences.

As also noted above, in some implementations, the type of content that is dynamically transformed by system 100/300 or client device 140/340 according to the present novel and inventive principles may be or include digital representations of persons, fictional characters, locations, objects, and identifiers such as brands and logos, for example, which populate a VR, AR, or MR environment. Moreover, that content may depict virtual worlds that can be experienced by any number of users synchronously and persistently, while providing continuity of data such as personal identity, user history, entitlements, possessions, payments, and the like. It is noted that the user responsive dynamic content transformation solution disclosed by the present application may also be applied to content that is a hybrid of traditional audio-video and fully immersive VR/AR/MR experiences, such as interactive video.

Continuing to refer to FIGS. 1, 2, 3, and 4 in combination, flowchart 470 further includes receiving sensor data 160/260/360 describing at least one of an action by user 126 of system 100/300 and client device 140/340 or an environment of user 126 (action 472). Sensor data 160/260/360 may be generated by client device 140/340 using any combination of an input device such as a keyboard, trackpad, or touch screen of client device 140/340, camera(s) 344, P/L sensor(s) 348, and microphone(s) 352, for example. Sensor data 160/260/360 may describe a manual input to client device 140/340 by user 126, speech by user 126, a movement such as a gesture by user 126, a facial expression by user 126, or any combination thereof. In addition, or alternatively, sensor data 160/260/360 may identify one or more of the type of venue occupied by user 126 (e.g., indoor or outdoor), actions by or the presence of other persons in the company of user 126 or within a predetermined distance from user 126, or the presence of a particular object or IoT enabled device possessed by user 126 or within a predetermined distance from the user 126.

In some implementations, sensor data 160/260/360 may be received in action 472 by software code 110/210/310a, executed by hardware processor 104/304 of system 100/300, and using content ingestion block 212 of software code 110/210/310a. In those implementations, sensor data 160/260/360 may be received by system 100/300 from client device 140/340 via communication network 108 and network communication links 128. However, in other implementations, sensor data 160/260/360 may be received in action 472 by software code 210/310b, executed by hardware processor 354 of system client device 140/340, and using content ingestion block 212 of software code 210/

310*b*. In those implementations, sensor data 160/260/360 may be received from one or more of an input device of client device 140/340, camera(s) 344, P/L sensor(s) 348, or microphone(s) 352.

Continuing to refer to FIGS. 1, 2, 3, and 4 in combination, flowchart 470 further includes identifying, using sensor data 160/260/360, as well as, in some implementations, sensor data 161/261/361, at least one of pre-rendered content components 124/224/324 as one or more content components to be transformed (hereinafter "content component(s) to be transformed") (action 473). By way of example, a content component to be transformed may be an audio track, such as one in which speech or song included in the pre-rendered content component is to have one or more of its audio properties modified or is to be transformed into sounds produced by a musical instrument. As another example, a content component to be transformed may be a portion of video to be transformed by having its brightness or darkness enhanced or reduced, or through selective changes to pixel colors.

As noted above, identification of content component(s) to be transformed, as well as the nature of the transformation, is performed using sensor data 160/260/360, or sensor data 160/260/360 and sensor data 161/261/361. Thus, the identification performed in action 473 may be based on a manual input to client device 140/340 by user 126, speech by user 126, a movement such as a gesture by user 126, a facial expression by user 126, or any combination thereof. In addition, or alternatively, the identification performed in action 473 may be based one or more of the type of venue occupied by user 126, actions by or the presence of other persons in the company of user 126 or within a predetermined distance from user 126, or the presence of a particular object or IoT enabled device possessed by user 126 or within a predetermined distance from the user 126. In addition, in some implementations the identification performed in action 473 may be based on metadata included in content file 122/222/322, or user profile 138/338 of user 126 describing known preferences of user 126 and including a user history of the user 126.

In some implementations, action 473 may be performed by software code 110/210/310*a*, executed by hardware processor 104/304 of system 100/300, and using content transformation block 214 of software code 110/210/310*a*. However, in other implementations, action 473 may be performed by software code 210/310*b*, executed by hardware processor 354 of system client device 140/340, and using content transformation block 214 of software code 210/310*b*.

Continuing to refer to FIGS. 1, 2, 3, and 4 in combination, flowchart 470 further includes transforming, using ML model(s) 132/232/332, the content component(s) to be transformed identified in action 473 to provide transformed content component(s) 134/234/334 (action 474). The transformation performed in action 474 may take a variety of forms. For example, where a pre-rendered content component 124/224/324 in the form of an audio track is transformed in action 474, that transformation may include transforming the audio frequency of a component of the audio track, one or more audio amplitude characteristics of a component of the audio track, or both. Alternatively, or in addition, such a transformation may include conversion of speech to sound produced by a musical instrument, or conversion of sound produced by one type of musical instrument to sound produced by a different type of musical instrument. Where a pre-rendered content component 124/224/324 in the form of a video sequence is transformed in action 474, that transformation may include changing the pixel intensity of each of multiple of pixels within one or more frames of the video sequence, changing the pixel color of each of multiple pixels within one or more frames of the video sequence, or changing both pixel intensity and pixel color.

In some implementations, action 474 may be performed by software code 110/210/310*a*, executed by hardware processor 104/304 of system 100/300, and using content transformation block 214 of software code 110/210/310*a* and ML model(s) 132/232/332. However, in other implementations, action 474 may be performed by software code 210/310*b*, executed by hardware processor 354 of system client device 140/340, and using content transformation block 214 of software code 210/310*b* and ML model(s) 132/232/332.

Continuing to refer to FIGS. 1, 2, 3, and 4 in combination, flowchart 470 further includes combining a subset of pre-rendered content components 124/224/324 with transformed content component(s) 134/234/334 to produce dynamically transformed content 162/262/362 (action 475). As noted above, in some implementations, the combining of at least some of pre-rendered content components 124/224/324 with transformed content component(s) 134/234/334 result in dynamically transformed content 162/262/362 being mixed or multiplexed content. In some implementations, combining by mixing may produce a single newly rendered audio track, a single newly rendered video track, or both. However, in some other implementations, the combining by multiplexing may result in dynamically transformed content 162/262/362 that includes an audio file including multiple interleaved audio tracks, a video file including interleaved or vertically layered video, or an audio file including multiple interleaved audio tracks and a video file including interleaved or vertically layered video. In yet other implementations, combining may result in dynamically transformed content 162 including a collection of multiple separate media content tracks, such as one or more audio tracks, one or more video sequences, or one or more audio tracks and one or more video sequences, for example.

In some implementations, action 475 may be performed by software code 110/210/310*a*, executed by hardware processor 104/304 of system 100/300, and using dynamic combination block 216 of software code 110/210/310*a*. However, in other implementations, action 475 may be performed by software code 210/310*b*, executed by hardware processor 354 of system client device 140/340, and using dynamic combination block 216 of software code 210/310*b*.

Continuing to refer to FIGS. 1, 2, 3, and 4 in combination, flowchart 470 further includes outputting dynamically transformed content 162/262/362 in real-time with respect to ingesting pre-rendered content components 124/224/324 (action 476). As noted above, in some implementations, pre-rendered content components 124/224/324 may have previously been separated from content file 122/222/322 and may be ingested directly from content database 120. In those implementations, as described by action 476, dynamically transformed content 162/262/362 is output in real-time with respect to ingesting pre-rendered content components 124/224/324.

However, in other implementations, content file 122/222/322 including pre-rendered content components 124/224/324 may be received from content database 120 as part of action 471, and pre-rendered content components 124/224/324 may be separated from content file 122/222/322, as discussed above. In those implementations, dynamically transformed content 162/262/362 is output in real-time with respect to receiving content file 122/222/322.

In some implementations, action 476 may be performed by software code 110/210/310a, executed by hardware processor 104/304 of system 100/300. In those implementations, outputting dynamically transformed content 162/262/362 in action 476 may include streaming or otherwise transmitting dynamically transformed content 162/262/362 to client device 140/340, via communication network 108 and network communication links 128 for example. However, in other implementations, action 476 may be performed by software code 210/310b, executed by hardware processor 354 of system client device 140/340. In those implementations, outputting dynamically transformed content 162/262/362 in action 476 may include rendering dynamically transformed content 162/262/362 using at least one of audio output device 350 or display 146/346 of client device 140/340.

With respect to the method outlined by flowchart 470, it is noted that, in various implementations, actions 471, 472, 473, 474, 475, and 476 may be performed in an automated process from which human participation may be omitted.

Figure 5A:
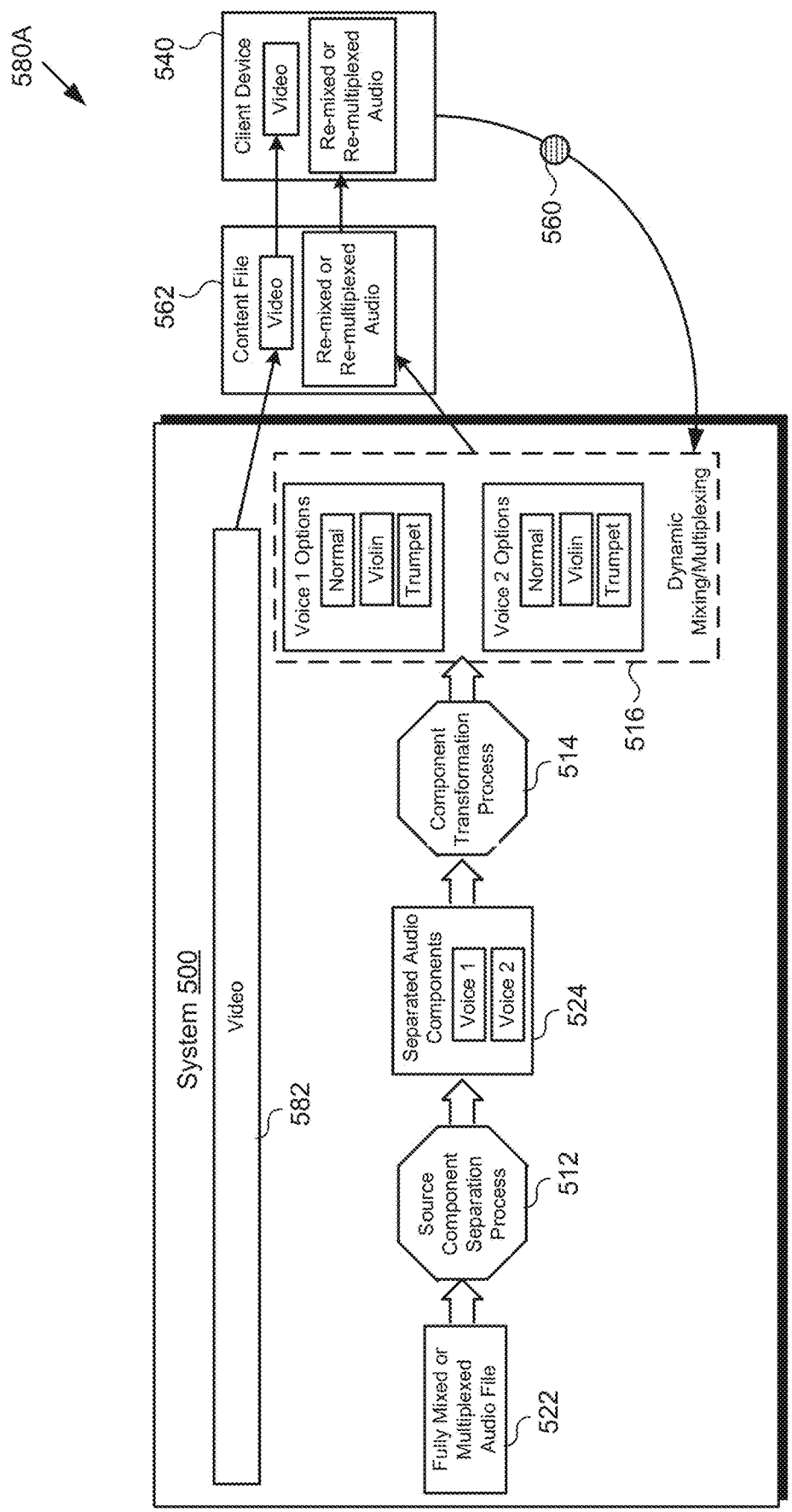
FIG. 5A shows an exemplary processing pipeline for performing user responsive dynamic content transformation, according to some implementations.
Figure 5B:
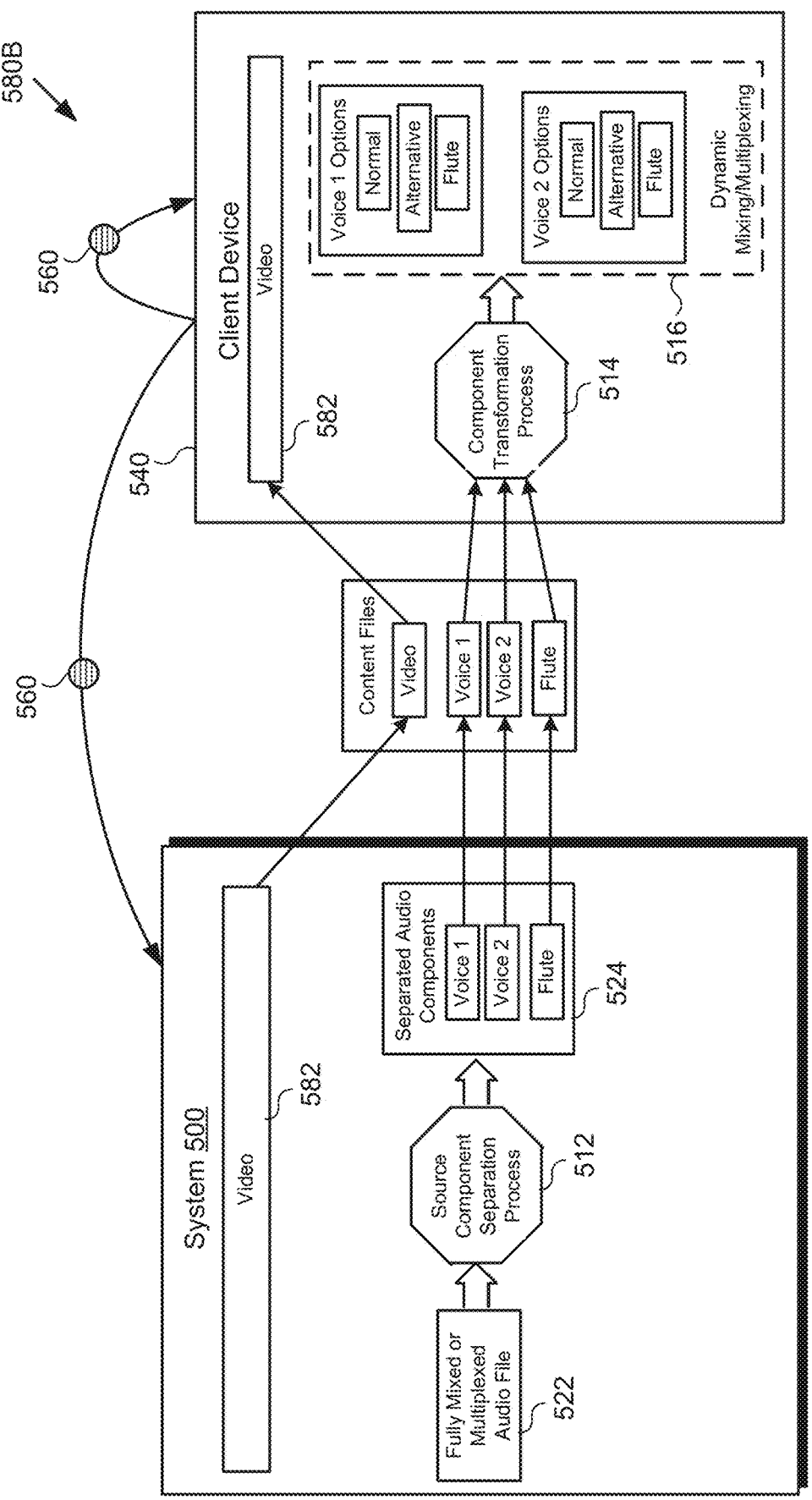
FIG. 5B shows an exemplary processing pipeline for performing user responsive dynamic content transformation, according to another implementation.

FIG. 5A shows exemplary processing pipeline 580A for performing user responsive dynamic content transformation, according to some implementations, while FIG. 5B shows exemplary processing pipeline 580B for performing user responsive dynamic content transformation, according to another implementation. The specific use cases represented by processing pipelines 580A and 580B are merely by way of example, and represent different implementations in which system 500 and client device 540 may be used to deliver dynamically transformed content 562 based on pre-rendered content that includes pre-rendered video component 582 and fully mixed or multiplexed audio file 522 including multiple pre-rendered and separable audio content components 524. Also shown in FIGS. 5A and 5B are source component separation process 512, component transformation process 514, dynamic mixing/multiplexing 516, and sensor data 560.

System 500 and client device 540 correspond respectively in general to system 100/300 and client device 140/340 in FIGS. 1 and 3. Consequently, system 500 and client device 540 may share any of the characteristics attributed to respective system 100/300 and client device 140/340 by the present disclosure, and vice versa. In addition, source component separation process 512, component transformation process 514, and dynamic mixing/multiplexing 516 correspond respectively in general to the functions performed by respective content ingestion block 212, content transformation block 214, and dynamic combination block 216 in FIG. 2. Thus, source component separation process 512, component transformation process 514, and dynamic mixing/multiplexing 516 may share any of the characteristics attributed to respective content ingestion block 212, content transformation block 214, and dynamic combination block 216 by the present disclosure, and vice versa. That is to say, source component separation process 512 may include use of ML model(s) 130/230/330, while component transformation process 514 may include use of ML model(s) 132/232/332.

Moreover, fully mixed or multiplexed audio file 522, sensor data 560, separated audio components 524, and dynamically transformed content 562 correspond respectively in general to content file 122/222/322, sensor data 160/260/360, pre-rendered content components 124/224/324, and dynamically transformed content 162/262/362 in FIGS. 1, 2, and 3. As a result, fully mixed or multiplexed audio file 522, sensor data 560, separated audio components 524, and dynamically transformed content 562 may share any of the characteristics attributed to respective content file 122/222/322, sensor data 160/260/360, pre-rendered content components 124/224/324, and dynamically transformed content 162/262/362 by the present disclosure, and vice versa.

Exemplary processing pipeline 580A, in FIG. 5A, may support several distinct implementations of the present user responsive dynamic content transformation solution. For example, in one such implementation source component separation process 512 and component transformation process 514 may be performed by system 500 and may occur in real-time based upon user interaction as manifested by sensor data 560. The transformed audio components could then be mixed or multiplexed by dynamic mixing/multiplexing 516 and be streamed or otherwise transmitted to client device 540 using standard protocol methods (e.g., Hypertext Transfer Protocol Live Streaming (HLS) format). The dynamically transformed audio could then be played by a client device 540 as normal, without requiring any special architecture on client device 540. The sonic character transformations available to be applied to each component audio track may themselves be dynamic based on input from client device 540, for example, or pre-defined as part of component transformation process performed by system 500. For example, it may be possible to transform a human voice into a trumpet, flute, saxophone, or other musical instrument, while it may be possible to transform a guitar into a zither, wind chime, or harp, for instance. Such an implementation provides maximum dynamic flexibility, while potentially placing significant demands on the hardware processing and software resources of system 500.

In another implementation supported by processing pipeline 580A, source component separation process 512 may occur prior to media content transmission, while component transformation process 514 occurs in real-time based upon user interaction as manifested by sensor data 560. For example, when new content is obtained by system 500 and before that content is available to users of system 500, source component separation process 512 may be performed using ML model(s) 130/230/330 in FIGS. 1, 2, and 3, which then makes available the separated audio components for later dynamic transformations, mixing or multiplexing, and delivery. This implementation may be advantageous in use cases in which hardware or software limitations make it too costly or time consuming for system 500 to perform source component separation process 512, or both source component separation process 512 and component transformation process 514, dynamically in real-time. This pre-transmission separation of pre-rendered content components may be substantially the same for all types of media, tailored for specific types of media, or tailored for each specific item of media. For example an interview type of media may be separated into person voice 1, person 2, and background music, while a musical piece of media might be separated into singer 1, bass, drums, strings, and so forth.

In another implementation supported by processing pipeline 580A, source component separation process 512 and component transformation process 514 applied to the resulting separated component audio tracks occur prior to transmission of media content to client device 540. Thus, when new content is obtained by system 500 and before that content is available to users of system 500, source component separation process 512 may be performed. Then, for each such separated audio track, one or more component transformation processes 514 may be applied, resulting in one or more audio tracks that contain variations of the original pre-rendered audio component. These processes thus result in a variety of available component audio tracks to participate in user manipulation, mixing or multiplexing, and transmission. Such pre-transmission sonic character transformation processes performed on each separated audio component may be identical for all such components or tailored for specific types of separated components. For example, the dialogue of a specific male character may be available as normal, as transformed into a violin, or as transformed into a trumpet, whereas the dialogue of a specific female character voice may be available as normal, as transformed into a flute, or as transformed into a different female voice. This implementation may be beneficial in cases where hardware or software limitations make it too costly or time consuming for system 500 to perform either source component separation process 512, component transformation process 514, or both source component separation process 512 and component transformation process 514, dynamically in real-time.

As shown in FIG. 5B, processing pipeline 580A supports another implementation in which component transformation process 514 and dynamic mixing or multiplexing occur on client device 540, with the preceding source component separation process 512 and component transformation process 514 being performed by system 500 (either dynamically based on sensor data 560, or prior to availability of the content to users). In such an implementation system 500 transmits media to the client via a transmission protocol with the capacity to stream multiple audio sources simultaneously for each supported language (for example a modified HLS format in the case of streaming) and played on client device 540 through a player able to play multiple audio sources simultaneously and control parameters of their playback independently. The client-side playing of such audio could be handled either by a single player capable of playing multiple audio tracks concurrently, as depicted in FIG. 5B, or by multiple players each playing the final transformed versions of each single separated component audio track concurrently. This implementation has the benefit of dividing the processing load between system 500 and client device 540.

Another implementation (not shown by FIGS. 5A and 5B) is one in which source component separation process 512, component transformation process 514, and dynamic mixing or multiplexing all occur on client device 540. This implementation requires no unusual modifications to a media-serving service or transmission protocol, and allows for all processes to be dynamically influenced based on parameters such as user behavior. Nevertheless, this implementation places all of the processing load on client device 540.

Thus, the present application discloses systems and methods for performing user responsive dynamic content transformation. The solution disclosed in the present application advances the state-of-the-art by utilizing one or more trained ML models to selectively transform one or more pre-rendered content components each corresponding respectively to a different feature of multiple features included in a content file, such as individual audio tracks or video sequences for example, in response to a variety of different factors. Examples of those factors may include one or more of user behavior, user gestures, content metadata, and interaction with connected IoT devices. Moreover, the present user responsive dynamic content transformation solution advantageously results in transformation of one or more content components in real-time with respect to ingesting the pre-rendered content components or receiving the content file that contains those content components.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a hardware processor; and
a system memory storing a software code and one or more machine learning (ML) model trained to transform content;
the hardware processor configured to execute the software code to:
ingest a plurality of content components, each of the plurality of content components corresponding respectively to a different feature of a plurality of features included in a content file;
receive sensor data describing at least one of an action by a system user or an environment of the system user;
identify, using the sensor data, at least one of the ingested plurality of content components as at least one content component to be transformed;
transform, using the at least one ML model, the at least one content component to be transformed, to provide at least one transformed content component;
combine a subset of the ingested plurality of content components with the at least one transformed content component to produce a dynamically transformed content; and
output the dynamically transformed content in real-time with respect to ingesting the plurality of content components.

2. The system of claim 1, wherein the ingested plurality of content components comprises at least one audio track.

3. The system of claim 2, wherein the transforming comprises changing at least one of an audio frequency or an audio amplitude characteristic of at least one component of the at least one audio track.

4. The system of claim 1, wherein the transforming comprises conversion of speech to sound produced by a musical instrument.

5. The system of claim 1, wherein the transforming comprises conversion of sound produced by a musical instrument to sound produced by a different musical instrument.

6. The system of claim 1, wherein the ingested plurality of content components comprises at least one video sequence.

7. The system of claim 6, wherein the transforming comprises changing at least one of a pixel intensity or a pixel color of each of a plurality of pixels within one or more frames of the video sequence.

8. The system of claim 1, wherein the content file comprises one of a mixed content file, a multiplexed content file, or a plurality of separate media content tracks.

9. The system of claim 8, wherein the content file comprises the mixed content file, and wherein in order to ingest the plurality of content components, the hardware processor is further configured to execute the software code to:
- receive the mixed content file; and
- separate, using another at least one ML model, the plurality of content components from the mixed content file;
- wherein the dynamically transformed content is output in real-time with respect to receiving the mixed content file.

10. The system of claim 1, wherein outputting the dynamically transformed content comprises transmitting the dynamically transformed content to a client device of the system user.

11. The system of claim 1, wherein the system further comprises at least one of an audio output device or a display, and wherein outputting the dynamically transformed content comprises rendering the dynamically transformed content using the at least one of the audio output device or the display.

12. The system of claim 1, wherein the dynamically transformed content comprises one of a mixed content file, a multiplexed content file, or a plurality of separate media content tracks.

13. A method for use by a system including hardware processor and a system memory storing a software code and at least one machine learning (ML) model trained to transform content, the method comprising:
- ingesting, by the software code executed by the hardware processor, a plurality of content components, each of the plurality of content components corresponding respectively to a different feature of a plurality of features included in a content file;
- receiving, by the software code executed by the hardware processor, sensor data describing at least one of an action by a system user or an environment of the system user;
- identifying, by the software code executed by the hardware processor and using the sensor data, at least one of the ingested plurality of content components as an at least one content component to be transformed;
- transforming, by the software code executed by the hardware processor and using the at least one ML model, the at least one content component to be transformed, to provide at least one transformed content component;
- combining, by the software code executed by the hardware processor, a subset of the ingested plurality of content components with the at least one transformed content component to produce a dynamically transformed content; and
- outputting, by the software code executed by the hardware processor, the dynamically transformed content in real-time with respect to ingesting the plurality of content components.

14. The method of claim 13, wherein the ingested plurality of content components comprises at least one audio track.

15. The method of claim 14, wherein the transforming comprises changing at least one of an audio frequency or an audio amplitude characteristic of at least one component of the at least one audio track.

16. The method of claim 13, wherein the transforming comprises conversion of speech to sound produced by a musical instrument.

17. The method of claim 13, wherein the transforming comprises conversion of sound produced by a musical instrument to sound produced by a different musical instrument.

18. The method of claim 13, wherein the ingested plurality of content components comprises at least one video sequence.

19. The method of claim 18, wherein the transforming comprises changing at least one of a pixel intensity or a pixel color of each of a plurality of pixels within one or more frames of the video sequence.

20. The method of claim 13, wherein the content file comprises one of a mixed content file, a multiplexed content file, or a plurality of separate media content tracks.

21. The method of claim 20, wherein the content file comprises the mixed content file, and wherein ingesting the plurality of content components further comprises:
- receiving, by the software code executed by the hardware processor, the mixed content file; and
- separating, by the software code executed by the hardware processor using another at least one ML model, the plurality of content components from the mixed content file;
- wherein the dynamically transformed content is output in real-time with respect to receiving the mixed content file.

22. The method of claim 13, wherein outputting the dynamically transformed content comprises transmitting the dynamically transformed content to a client device of the system user.

23. The method of claim 13, wherein the system further comprises at least one of an audio output device or a display, and wherein outputting the dynamically transformed content comprises rendering the dynamically transformed content using the at least one of the audio output device or the display.

24. The method of claim 13, wherein the dynamically transformed content comprises one of a mixed content file, a multiplexed content file, or a plurality of separate media content tracks.

* * * * *